(12) United States Patent
King

(10) Patent No.: US 8,988,192 B2
(45) Date of Patent: Mar. 24, 2015

(54) REMOTE CONTROL BIOMETRIC USER AUTHENTICATION

(75) Inventor: John Kelly King, Atlanta, GA (US)

(73) Assignee: Cox Communication, Inc., Atlanta, GA (US)

( * ) Notice: Subject to any disclaimer, the term of this patent is extended or adjusted under 35 U.S.C. 154(b) by 273 days.

(21) Appl. No.: 13/028,235

(22) Filed: Feb. 16, 2011

(65) Prior Publication Data

US 2012/0206236 A1    Aug. 16, 2012

(51) Int. Cl.
G06F 7/04 (2006.01)
G06F 21/32 (2013.01)

(52) U.S. Cl.
CPC ........ G06F 21/32 (2013.01); *G06F 2221/2149* (2013.01)
USPC .......... 340/5.83; 340/5.82; 382/115; 713/186

(58) Field of Classification Search
USPC ...................... 235/382–382.5; 340/5.52–5.53, 340/5.74–5.84; 379/88.01–88.02; 382/115–116, 124; 704/275; 705/64, 705/67; 713/170, 182, 186; 726/19, 27–29
See application file for complete search history.

(56) References Cited

U.S. PATENT DOCUMENTS

| | | | |
|---|---|---|---|
| 5,920,642 A * | 7/1999 | Merjanian | 382/126 |
| 6,256,019 B1 * | 7/2001 | Allport | 345/169 |
| 6,637,029 B1 * | 10/2003 | Maissel et al. | 725/46 |
| 7,564,369 B1 * | 7/2009 | Adams et al. | 340/12.53 |
| 8,408,456 B2 * | 4/2013 | Weintraub et al. | 235/382 |
| 2002/0059588 A1 * | 5/2002 | Huber et al. | 725/35 |
| 2003/0028872 A1 * | 2/2003 | Milovanovic et al. | 725/12 |
| 2003/0051138 A1 * | 3/2003 | Maeda et al. | 713/168 |
| 2003/0108227 A1 * | 6/2003 | Philomin et al. | 382/124 |
| 2003/0172283 A1 * | 9/2003 | O'Hara | 713/186 |
| 2006/0107281 A1 * | 5/2006 | Dunton | 725/11 |
| 2007/0150415 A1 * | 6/2007 | Bundy et al. | 705/51 |
| 2007/0157242 A1 * | 7/2007 | Cordray et al. | 725/46 |
| 2007/0299670 A1 * | 12/2007 | Chang | 704/275 |
| 2007/0300259 A1 * | 12/2007 | Chan | 725/46 |
| 2009/0146779 A1 * | 6/2009 | Kumar et al. | 340/5.31 |
| 2009/0199242 A1 * | 8/2009 | Johnson et al. | 725/46 |
| 2010/0045433 A1 * | 2/2010 | Boyd et al. | 340/5.83 |
| 2010/0052853 A1 * | 3/2010 | Hilton | 340/5.83 |
| 2010/0257601 A1 * | 10/2010 | Bolyukh et al. | 726/16 |
| 2011/0099017 A1 * | 4/2011 | Ure | 704/275 |
| 2011/0121943 A1 * | 5/2011 | Morovitz et al. | 340/5.82 |
| 2012/0144419 A1 * | 6/2012 | Gu et al. | 725/34 |
| 2014/0115628 A1 * | 4/2014 | Park et al. | 725/37 |

* cited by examiner

*Primary Examiner* — Benjamin C Lee
*Assistant Examiner* — Stephen Burgdorf
(74) *Attorney, Agent, or Firm* — Merchant & Gould

(57) ABSTRACT

A remote control device for providing individualized access control. The remote control device includes an interface for accepting input from a user and forwarding a signal corresponding the to the input from the user to a conditional access device, a biometric scanner, coupled to the remote device, for reading a biometric characteristic of a user and a processor, coupled to the interface, for generating a signal associated with the reading of the biometric characteristic of the user that is transmitted to the conditional access device for analysis to determine a function corresponding to the input from the user to execute.

20 Claims, 5 Drawing Sheets

REMOTE CONTROL BIOMETRIC USER AUTHENTICATION

FIELD OF THE INVENTION

This disclosure relates in general to remote controls for media devices, and more particularly to biometric user authentication using a remote control of a media device.

BACKGROUND

Communications systems operators provide guides to help provide the video channels and all the programs that come with them, including linear and on-demand programs. Metadata is associated with the programs including the name of the show, actors, start time, end time, ratings, etc. Based on this metadata, parental control may be set up to prevent the viewing of any scenes of programming of a predetermined rating, e.g., PG-13 and above because of adult content. Thus, when a channel is tuned to a program that is not below the predetermined rating, a screen is presented for entering a pin in order to watch access the program.

More often than not, authentication uses a four digit pin to enable access to content. Two forms of pin have been used. A first form of pin is for principal control and the other form of pin is for purchases. Typically, an adult in the house that theoretically has set the pin. Usually this person is the person that knows the pin. Accordingly, the person that set the pin can enter it and thereby watch programs that normally would be filtered to prevent children from watching such programs.

This procedure also applies to purchasing transactions. However, purchasing transactions may not correlate to the filtering requirements associated with program control ratings. For example, subscribers may not want their child to purchase a Disney on-demand movie. The subscriber may approve of the content, but not want such purchases to be enabled. Thus, a separate pin may be used for purchasing transactions.

One problem with such authentication methods, is the user often forgets one or both of the pins. Another problem is that someone else sets it up and the person that is not authorized may want to watch a program or purchase a video-on-demand program. For example, the pins may be set by the smart teenager in the house and the parent does not realize this until later. To have the pins reset, the parent has to contact the communications system operator to request the pin be reset. This is inconvenient to the customer and lowers customer satisfaction.

It can be seen then that there is a need for providing individualized user authentication using a media device remote control.

SUMMARY OF THE INVENTION

To overcome the limitations described above, and to overcome other limitations that will become apparent upon reading and understanding the present specification, embodiments for biometric user authentication using a media device remote control.

The above-described problems are solved by providing individualized authentication for each user associated with a particular subscriber.

An embodiment includes a remote control device for providing individualized access control. The remote control device includes an interface for accepting input from a user and forwarding a signal corresponding the to the input from the user to a conditional access device, a biometric scanner, coupled to the remote device, for reading a biometric characteristic of a user and a processor, coupled to the interface, for generating a signal associated with the reading of the biometric characteristic of the user that is transmitted to the conditional access device for analysis to determine a function corresponding to the input form the user to execute.

In another embodiment, a method for providing individualized access control for a user is disclosed. The system includes receiving, from a user of a remote control device, an input command via a user input interface of the remote control device, gathering biometric characteristics of the user using a biometric data retrieval module on the remote control device, providing the input command and the biometric characteristic of the user from the remote control device to a conditional access device, analyzing the biometric characteristic of the user with reference to biometric characteristics stored in memory at the conditional access device, determining whether to authenticate the user based on the analysis of the biometric characteristics of the user and executing, by the conditional access device, a process in accordance with the input data received from the remote control device when the user of the remote control device is authenticated.

A computer readable medium, including executable instructions which, when executed by a processor, provides individualized access control for a user, is disclosed. The computer readable medium includes instructions executable by the processor to receive, from a user of a remote control device, an input command via a user input interface of the remote control device, gather biometric characteristics of the user using a biometric data retrieval module on the remote control device, provide the input command and the biometric characteristic of the user from the remote control device to a conditional access device, analyze the biometric characteristic of the user with reference to biometric characteristics stored in memory at the conditional access device, determine whether to authenticate the user based on the analysis of the biometric characteristics of the user and executing, by the conditional access device, a process in accordance with the input data received from the remote control device when the user of the remote control device is authenticated.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to providing biometric user authentication using a media device remote control. By using a remote control of a media device with a biometric input module, individualized authentication for each user associated with a particular subscriber may be provided. Each user may then be able to enjoy a personalized experience using individual associations and presentation characteristics.

Figure 1:
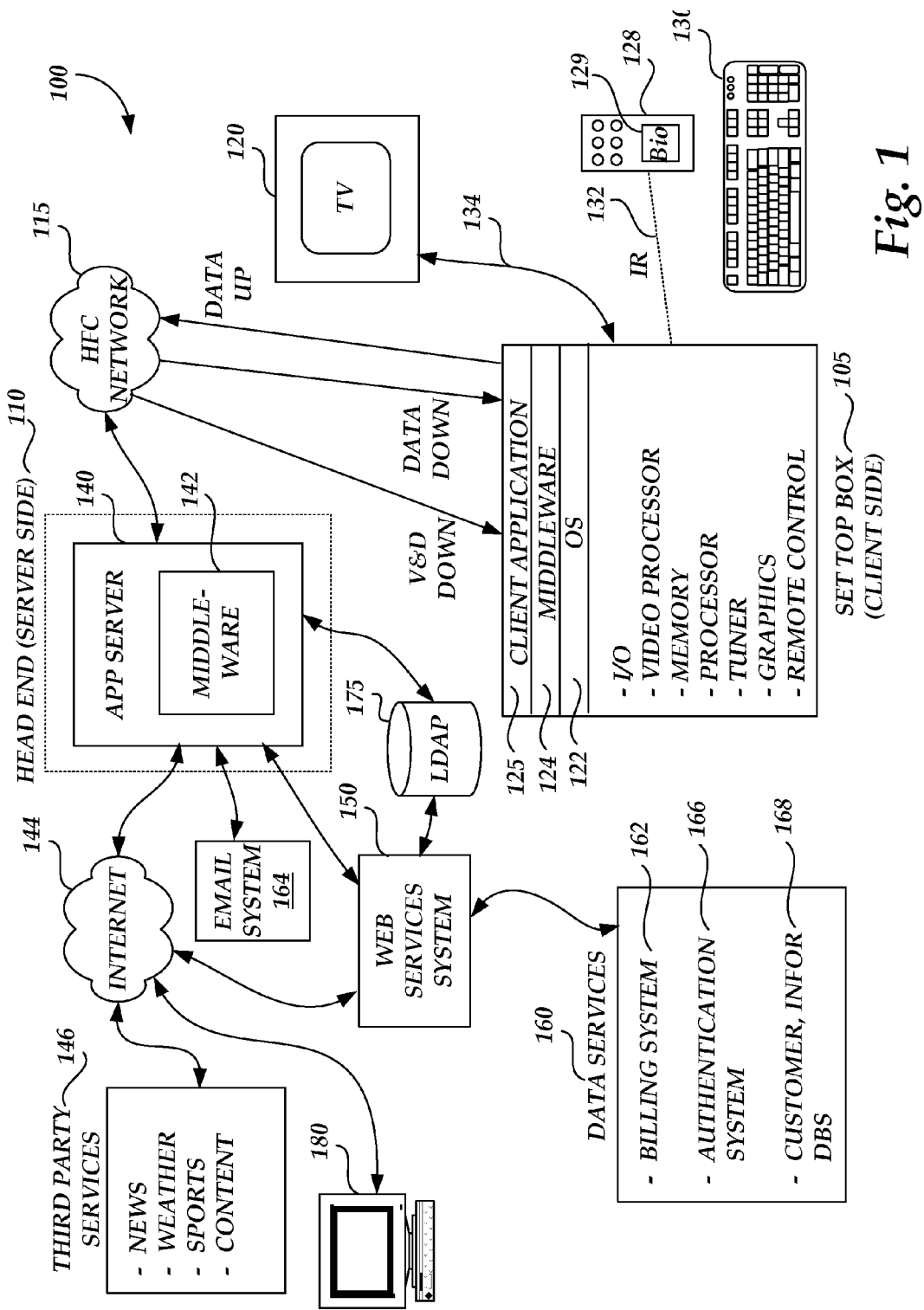
FIG. 1 is a simplified block diagram illustrating a cable television/services system architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
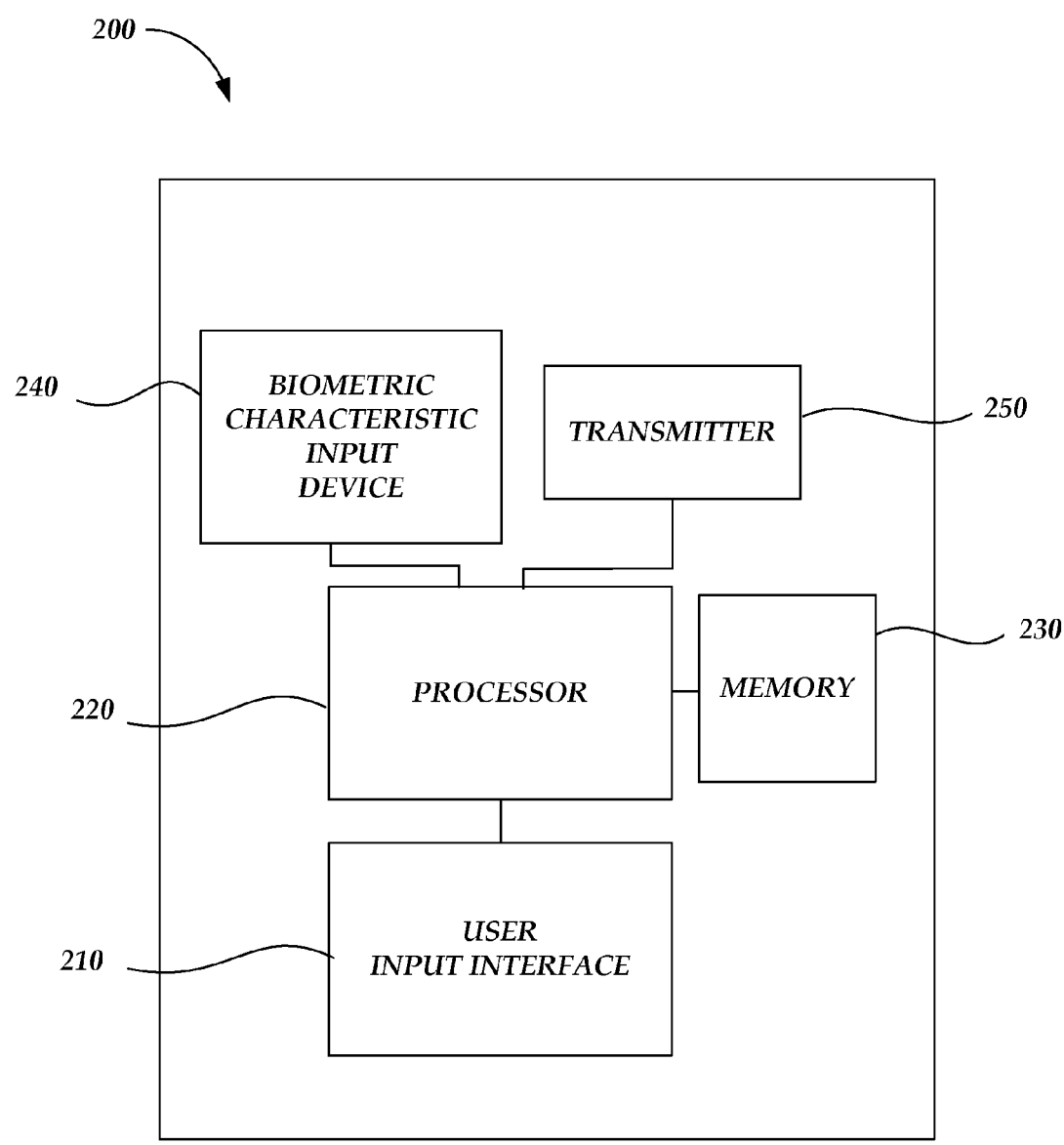
FIG. 2 is a remote control device according to an embodiment of the invention.

FIG. 2 is a remote control device 200 according to an embodiment of the invention. In FIG. 2, the remote control device 200 includes a user input interface 210 for accepting input from a user. The user input interface 210 provides the user input to the processor 220. Memory 230 is provided to providing storage for data and instructions. A biometric characteristic input device 240 is implemented by the remote control device 200. The biometric characteristic input device 240 obtains biometric characteristics of the user and provides the biometric characteristic data to the processor 220. The processor causes transmitter 250 to transmit the data to a controlled access device (not shown in FIG. 2) for processing. Based on this processing, the user may provide further data through use of the user input interface 210.

Accordingly, the remote control device 200 forwards a signal corresponding to the input from the user to a conditional access device. The processor 220 generates a signal associated with the reading of the biometric characteristic of the user via the biometric characteristic input device 240. This signal is transmitted to the conditional access device for analysis to determine whether to execute a function corresponding to the input provided by the user through the use of the user input interface 210.

Memory 230 may include persistent memory for storing biometric characteristic of a plurality of users of the remote control device 200. The biometric characteristic input device may be implemented as a capacitive finger print scanner, an optical retina scanner, a voice print scanner or other device for obtaining biometric characteristics.

Figure 3:
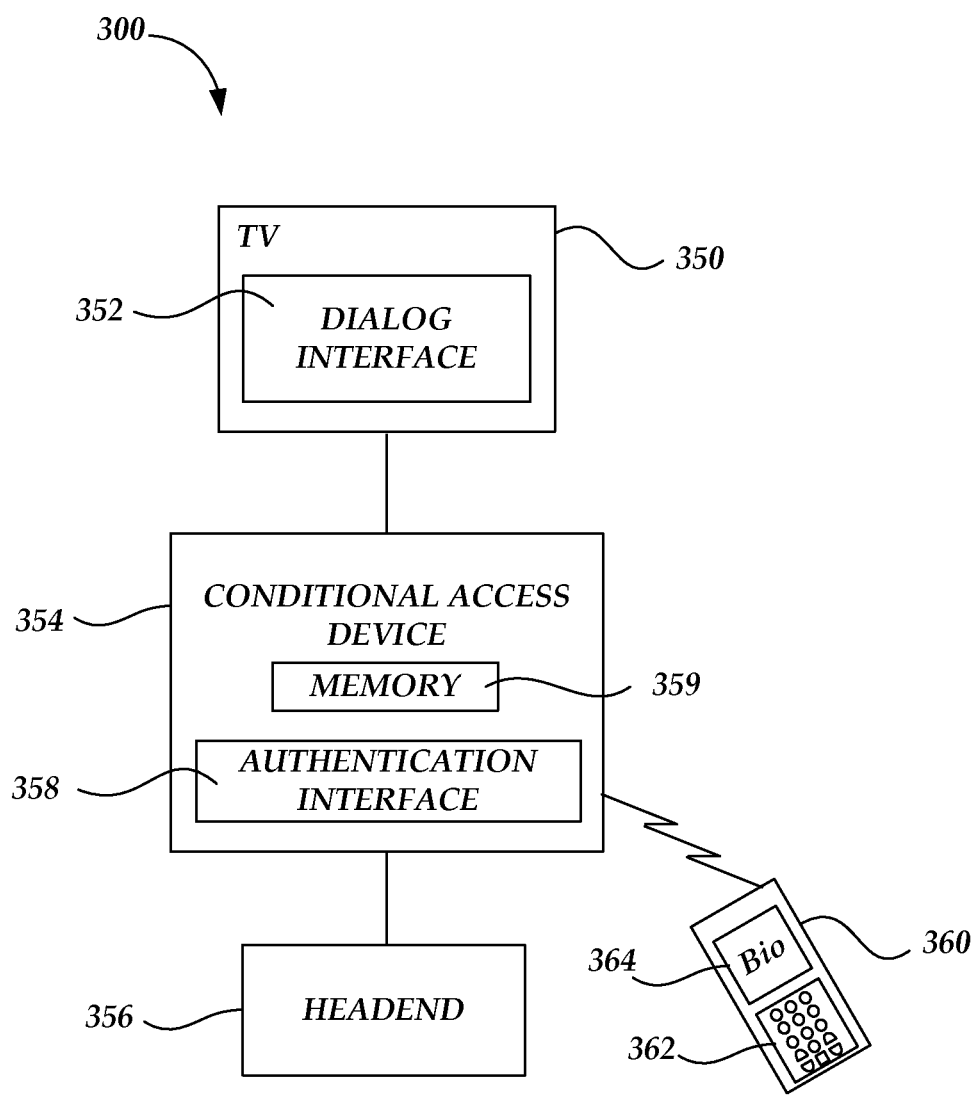
FIG. 3 illustrates a system for implementing biometric user authentication using a media device remote control according to an embodiment of the invention.

FIG. 3 illustrates a system 300 for implementing biometric user authentication using a media device remote control according to an embodiment of the invention. A television 350, or other media display device, is used to present media content to a user. A user may use a remote control device 360 to select programs and other content for presentation on the television 350. A headend 356 provides the content to a conditional access device 354 at the user's premises.

The remote control device 360 includes a biometric data retrieval module 364 for obtaining a reading of biometric characteristics of a user. The remote control device 360 also includes an input interface 362, such as a keypad, for use by the user to provide input commands for selecting a channel, for providing control signals to the conditional access device 354, for making purchases, etc.

The conditional access device 354 implements an authentication interface 358 that, instead of displaying a pin challenge screen, provides a dialog interface 352 on the television 350 that requests that the user be authenticated before the conditional access device 354 will proceed with executing commands consistent with input provided by the users through the input interface 363 on the remote control device 360, e.g., change the channel, order a PPV program, upgrade a service, etc.

When authentication process is initially setup on the conditional access device 354, a biometric characteristic of a user is digitized by the biometric data retrieval module 364 and sent to the conditional access device 354 for storage and further processing. The authentication module 358 at the conditional access device 354 stores the data in memory 359. The type of biometric characteristic used may be particular for the particular conditional access device 354. However, there may be other conditional access devices 354 in the home. Each time the user interfaces with a conditional access device 354, the biometric characteristic read by biometric data retrieval module 364 of the remote control device 360 has to be analyzed with reference to biometric characteristics stored in memory 359 at that conditional access device 354.

The conditional access device 354 may store biometric characteristics for multiple users and authenticate each user using the biometric characteristics stored in memory 359. Thus, each user can be granted different viewing privileges and purchasing privileges. The individual identification may also be used for other functions, such as accessing the user's score for video games, the user's viewing history, etc. Further, favorite channels could be setup for each user and associated with the stored biometric characteristic of that user. In this manner, channels may be filtered from the Interactive Program Guide ("IPG") shown to the user to provide a customized IPG. Other settings may be tied to different biometric readings.

Some users may prefer using a biometric reading by the biometric data retrieval module 364, while others prefer using a secured input pin code. For the users that prefer using a pin code, the biometric data retrieval module 364 may be used to generate a unique four digit pin code for that user. The digital signature associated with the biometric characteristic may be forwarded to the conditional access device 354. The digital signature may also be stored in the memory (not shown) implemented in the remote control device 360. By using a remote control device 360 having a biometric data input module 364, individualized authentication for each user associated with a particular subscriber may be provided. Each user may then be able to enjoy a personalized experience using individual associations and presentation characteristics.

Figure 4:
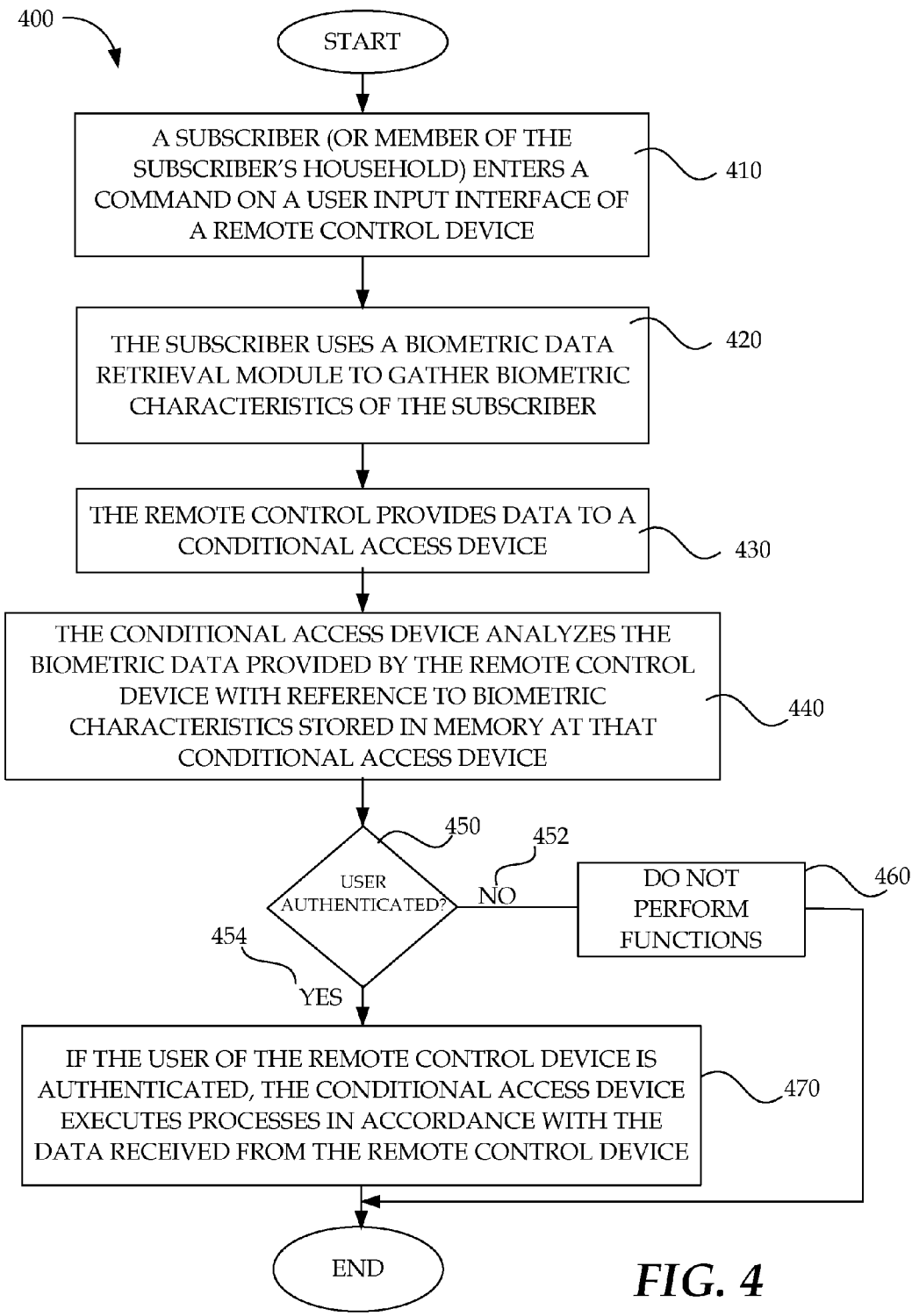
FIG. 4 is a flowchart of a method for providing biometric authentication of a subscriber using a media device remote control according to an embodiment of the invention.

FIG. 4 is a flowchart 400 of a method for providing biometric authentication of a subscriber using a media device remote control according to an embodiment of the invention. In FIG. 4, a subscriber (or member of the subscriber's household) enters a command on a user input interface of a remote control device 410. The subscriber uses a biometric data retrieval module to gather biometric characteristics of the subscriber 420. The remote control provides data to a conditional access device 430. The conditional access device analyzes the biometric data provided by the remote control device with reference to biometric characteristics stored in memory at that conditional access device 440. A determination is made whether to authenticate the user 450. If the user is not authenticated 452, the functions are not performed 460. If the user of the remote control device is authenticated 454, the conditional access device executes processes in accordance with the data received from the remote control device 470. The conditional access device may change a channel, engage in a dialog with the user regarding the purchase of items or content, such as subscription packages, etc.

Figure 5:
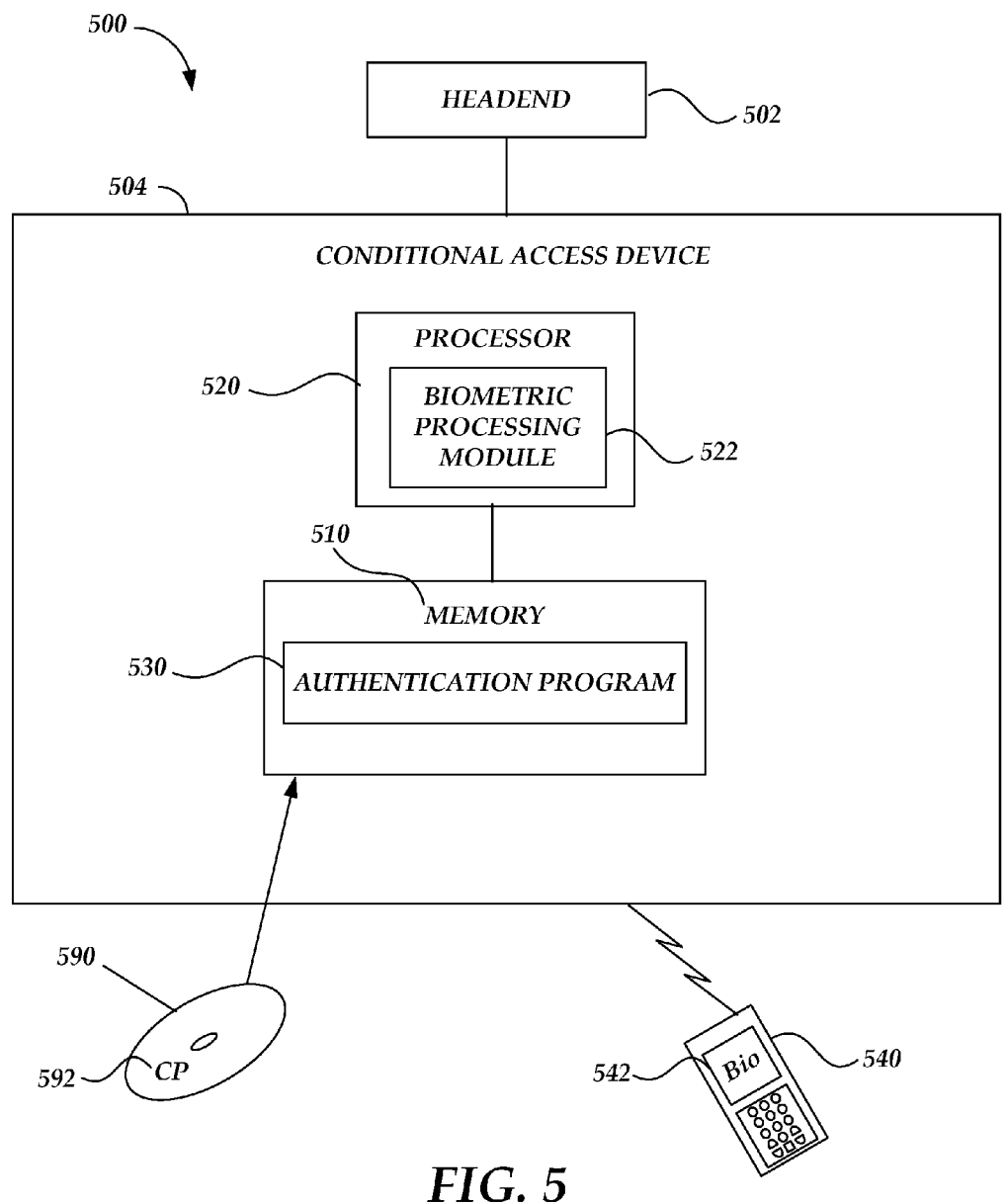
FIG. 5 illustrates a system according to an embodiment of the invention.

FIG. 5 illustrates a system 500 according to an embodiment of the invention. The system 500 includes a headend 502 that provides content to a conditional access device 504. The conditional access device 504 may be a STB, a DVR, a CableCard™, etc. The conditional access device 504 includes memory 510 for storing data. In FIG. 5, the conditional access device 504 is coupled to a headend 502 for receiving content therefrom. The memory 510 is in communication with processor 520. The memory 510 includes an authentication program 530 that is executed by the processor to perform biometric processing. The processor 520 may implement a biometric processing module 522 to analyze biometric data received from remote control device 540. Remote control device 540 includes, among other functional modules, a biometric input device 542 for obtaining biometric information from the user.

Embodiments may also be implemented in combination with computer systems and program modules. Generally, program modules include routines, programs, components, data structures, and other types of structures that perform particular tasks or implement particular abstract data types. By way of example, computer readable media 590 can include computer storage media or other tangible media. Computer storage media 590 includes volatile and nonvolatile, removable and non-removable media implemented in any method or technology for storage of information 592, such as computer readable instructions, data structures, program modules or other data. Moreover, those skilled in the art will appreciate that the invention may be practiced with other computer system configurations, including hand-held devices, set-top boxes, DVRs, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 590 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 590 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 520 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 510 thus may store the computer-executable instructions that, when executed by processor 520, cause the processor 520 to implement a system as illustrated in FIGS. 1-4 above.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A remote control device having individualized access control, comprising:
   an interface for accepting input from a user and forwarding a signal corresponding to the input from the user to a conditional access device;
   a biometric scanner, coupled to the remote control device, for reading a biometric characteristic of the user; and
   a processor, coupled to the interface, for generating a secured unique four digit pin code and a digital signature associated with the reading of the biometric characteristic of the user, wherein at least one of: the digital signature and the secured unique four digit pin code is transmitted to the conditional access device for analysis to determine a function corresponding to the input from the user to execute, the conditional access device providing a personalized experience based upon the user providing at least one of: the biometric characteristic and the secured unique four digit pin code, wherein the personalized experience includes viewing privileges that allow access to subscription package content and a user's viewing history, purchasing privileges that authorize the user to purchase content, and a filtering of an interactive program guide to provide the user with an individualized interactive program guide having individualized associations and presentation characteristics for the user.

2. The remote control device of claim 1 further comprising persistent memory, coupled to the biometric scanner, the memory storing biometric characteristics of a plurality of users.

3. The remote control device of claim 1, wherein the processor generates the secured unique four digit in code and the digital signature based on an analysis of the biometric characteristic received from the user.

4. The remote control device of claim 1, wherein the biometric scanner is a capacitive finger print scanner.

5. The remote control device of claim 1, wherein the biometric scanner is an optical retina scanner.

6. The remote control device of claim 1, wherein the biometric scanner is a voice print scanner.

7. A method for providing individualized access control for a user, comprising:
   receiving, from the user of a remote control device, an input command via a user input interface of the remote control device;
   gathering biometric characteristics of the user using a biometric data retrieval module on the remote control device;
   generating a secured unique four digit pin code associated with the biometric characteristics of the user;
   providing the input command and at least one of: the biometric characteristics of the user and the secured unique four digit pin code from the remote control device to a conditional access device for storage in memory at the conditional access device, the biometric characteristics being used to generate a digital signature associated with the biometric characteristics of the user;
   analyzing at least one of: the digital signature generated from the biometric characteristics and the secured unique four digit pin code with reference to the at least one of: the biometric characteristics of the user and the secured unique four digit in code stored in memory at the conditional access device;
   determining whether to authenticate the user based on the analysis of the at least one of: the digital signature generated from the biometric characteristics of the user and the secured unique four digit pin code; and
   executing, by the conditional access device, a process in accordance with the input command received from the remote control device when the user of the remote control device is authenticated to provide a personalized experience based upon at least one of: the biometric characteristics of the user and the secured unique four digit pin code, wherein the personalized experience includes viewing privileges that allow access to subscription package content and a user's viewing history, purchasing privileges that authorize the user to purchase content, and a filtering of an interactive program guide to provide the user with an individualized interactive program guide having individualized associations and presentation characteristics for the user.

8. The method of claim 7, wherein the executing the process comprises changing a channel.

9. The method of claim 7, wherein the executing the process comprises engaging in a dialog with the user regarding a purchase of items.

10. The method of claim 7, wherein the executing the process comprises engaging in a dialog with the user regarding a purchase of a subscription packages from a content provider.

11. The method of claim 7 further comprising prohibiting performance of the process when the user is not authenticated.

12. The method of claim 7, wherein the gathering the biometric characteristics of the user comprises scanning a finger print of the user.

13. The method of claim 7, wherein the gathering the biometric characteristics of the user comprises optically scanning a retina of the user.

14. The method of claim 7, wherein the gathering the biometric characteristics of the user comprises scanning a voice print of the user.

15. A non-transitory computer readable storage medium including executable instructions which, when executed by a processor, provides individualized access control for a user, by:

receiving, from the user of a remote control device, an input command via a user input interface of the remote control device;

gathering biometric characteristics of the user using a biometric data retrieval module on the remote control device;

generating a secured unique four digit pin code associated with the biometric characteristic of the user;

providing the input command and at least one of: the biometric characteristics of the user and the secured unique four digit pin code from the remote control device to a conditional access device for storage in memory at the conditional access device, the biometric characteristics being used to generate a digital signature associated with the biometric characteristics of the user;

analyzing at least one of: the digital signature generated from the biometric characteristics and the secured unique four digit pin code with reference to the at least one of: the biometric characteristics of the user and the secured unique four digit in code stored in memory at the conditional access device;

determining whether to authenticate the user based on the analysis of at least one of the least one of the biometric characteristic and the secured unique four digit pin code;

determining whether to authenticate the user based on the analysis of the at least one of: the digital signature generated from the biometric characteristics of the user and the secured unique four digit pin code; and executing, by the conditional access device, a process in accordance with the input command received from the remote control device when the user of the remote control device is authenticated to provide a personalized experience based upon at least one of: the biometric characteristics of the user and the secured unique four digit pin code, wherein the personalized experience includes viewing privileges that allow access to subscription package content and a user's viewing history, purchasing privileges that authorize the user to purchase content, and a filtering of an interactive program guide to provide the user with an individualized interactive program guide having individualized associations and presentation characteristics for the user.

16. The non-transitory computer readable storage medium of claim 15, wherein the executing the process comprises changing a channel.

17. The non-transitory computer readable storage medium of claim 15, wherein the executing the process comprises engaging in a dialog with the user regarding a purchase of items.

18. The non-transitory computer readable storage medium of claim 15, wherein the executing the process comprises engaging in a dialog with the user regarding a purchase of a subscription packages from a content provider.

19. The non-transitory computer readable storage medium of claim 15 further comprising prohibiting performance of the process when the user is not authenticated.

20. The non-transitory computer readable storage medium of claim 15, wherein the gathering biometric characteristics of the user comprises at least one selected from the group consisting of scanning a finger print of the user, optically scanning a retina of the user and scanning a voice print of the user.

* * * * *